Nov. 7, 1933.  W. BIRON  1,934,584
DOORLOCK FOR STREET CARS, MOTOR BUSSES, AND SHIPS
Filed Nov. 19, 1932  2 Sheets-Sheet 1
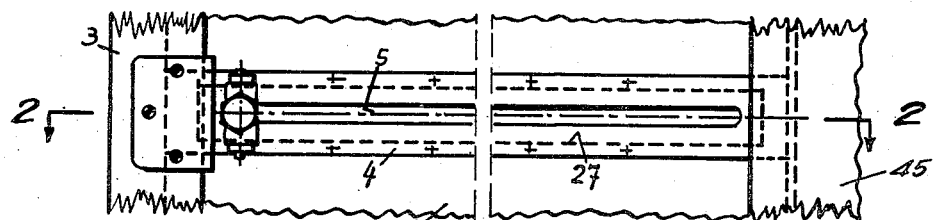
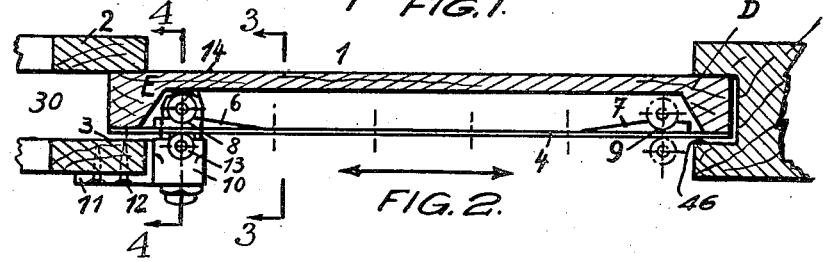
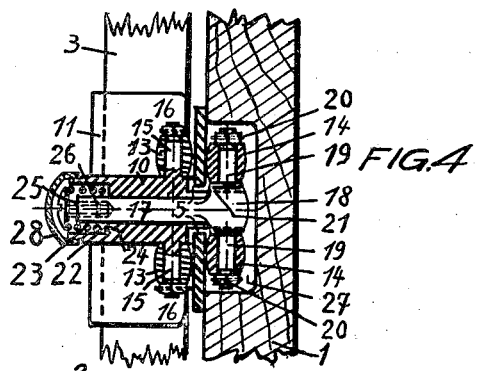
Inventor:
Wilhelm Biron Nov. 7, 1933.   W. BIRON   1,934,584
DOORLOCK FOR STREET CARS, MOTOR BUSSES, AND SHIPS
Filed Nov. 19, 1932   2 Sheets-Sheet 2
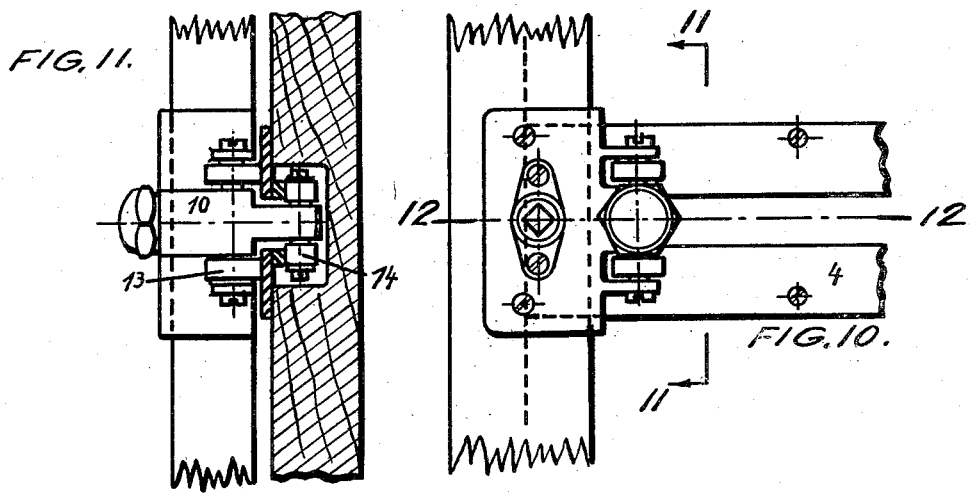
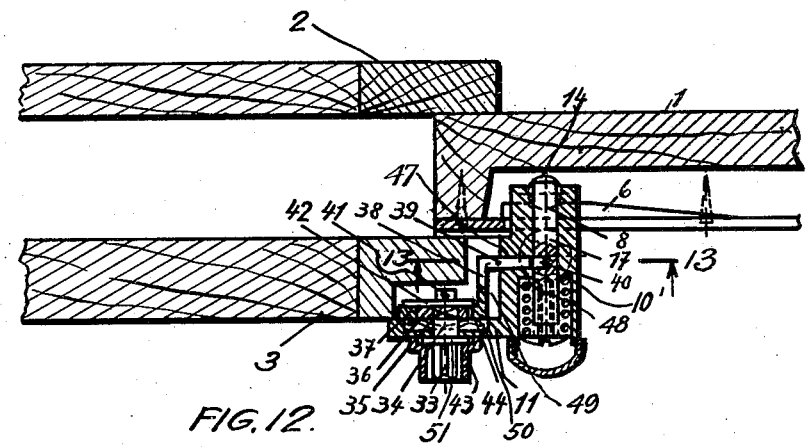
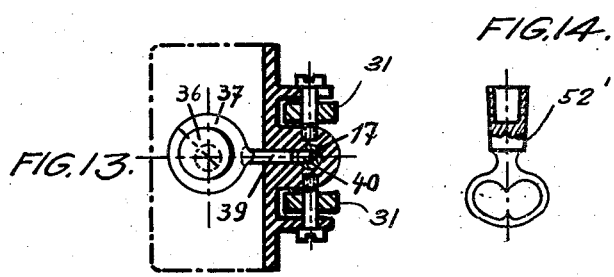
Inventor:
Wilhelm Biron Patented Nov. 7, 1933

1,934,584

UNITED STATES PATENT OFFICE 1,934,584

DOORLOCK FOR STREET CARS, MOTOR BUSSES AND SHIPS

Wilhelm Biron, Frankfort-on-the-Main-Hochst, Germany

Application November 19, 1932, Serial No. 643,515, and in Germany October 9, 1931

7 Claims. (Cl. 70—31)

This invention relates to a lock designed primarily for use in connection with sliding doors of street cars, but it is to be understood that the lock is to be used in any connection for which it may be found applicable, and the invention has for its object to provide means in a manner as hereinafter referred to for preventing rattling or shifting of a sliding door for vehicles when the door is opened or closed during the traveling or when the vehicle is standing still.

A further object of the invention is to provide in a manner as hereinafter set forth, means to prevent the sliding door of a vehicle from automatically opening or closing from sudden shocks.

A further object of the invention is to provide, in a manner as hereinafter set forth, means to prevent a sliding door from automatically shifting from partly opened or partly closed position.

A further object of the invention is to provide, in a manner as hereinafter set forth, means for fixedly securing a sliding door from movement when the door is in fully opened or fully closed position.

A further object of the invention is to provide, in a manner as hereinafter set forth, a lock for the sliding door of a vehicle, and with the lock including means whereby its usefulness is not impaired to prevent movement of the door, from locked, closed or open position, when the vehicle with which the door is associated has been in use for a long period.

To the above ends essentially and to others which may hereinafter appear, the invention consists of such parts and such combination of parts as fall within the scope of the invention as claimed.

In the drawings:

Figure 1 is a fragmentary view in elevation of the body of a vehicle showing the door lock.

Figure 2 is a section on line 2—2 Figure 1.

Figure 3 is a section on line 3—3 Figure 1.

Figure 4 is a section on line 4—4 Figure 1.

Figure 5 is a sectional plan of the door showing the adaptation therewith of the roll structure.

Figure 6 is a fragmentary view in top plan of the coupling plate showing the adaptation therewith of the inner rolls of the roll structure.

Figure 7 is a fragmentary view in top plan showing a modified form of coupling plate.

Figure 8 is a fragmentary view in top plan illustrating a modified form of coupling plate and an inner roll.

Figure 9 is an elevation of a sliding door showing the adaptation therewith of the lock.

Figure 10 is a fragmentary view in front elevation of the lock upon an enlarged scale.

Figure 11 is a section on line 11—11 Figure 10.

Figure 12 is a section on line 12—12 Figure 10.

Figure 13 is a section on line 13—13 Figure 10.

Figure 14 is a sectional view of the key for the bolt locking mechanism.

Referring to the drawings there is shown a wall 31, Figure 9, of a vehicle and with the wall formed with a door opening having at one side thereof a frame member 45 provided with a vertically disposed groove 46. At the other side of said door opening there is arranged a pair of parallel spaced uprights or guides 2, 3. The wall 31 has a pocket or chamber 30 which opens into the space between the uprights 2, 3. For the purpose of closing the door opening, a sliding door 1 is employed. The door 1 when completely closed is extended into groove 46 and when opened is shifted to pass into the pocket 30 to an extent whereby its outer side will project outwardly from uprights 2, 3.

One face of door 1, preferably at its center, is formed with a transversely disposed oblong cavity 27 of a length to extend to a point in proximity to each side edge thereof. The depth of the cavity 27 is as desired. The end walls of cavity 27 are oppositely inclined and their inclination is outwardly. Fixedly secured to that face of door 1 formed with the cavity 27 is an oblong coupling plate 4 of a width materially greater than cavity 27 and of a length to extend from one side edge to the other of door 1. The plate 4 is formed centrally with a lengthwise extending slot 5 of less width than that of cavity 27.

The inner face of plate 4 is provided with two spaced pair of oppositely disposed spaced wedging ribs. The ribs of one pair are indicated at 6 and those of the other pair at 7. The ribs 6 are arranged in parallel spaced relation, flush with the side edge of slot 5 at one end thereof and each formed in its inner or rear face or rear edge, intermediate its ends with a depression 8 to provide a retainer. The depressions 8 are arranged in parallelism. Each rib 6 has its inner or rear face inclining upwardly from its inner end to depression 8. The ribs 7 are arranged at the other end of slot 5 and constructed in the same manner as, but are oppositely disposed with respect to ribs 6. The depressions in ribs 7 are designated 9. The plate 4 provides for slidably coupling a locking roll structure with the door 1. The roll structure is anchored to upright 3 and is extended laterally with respect to the outer side edge of the latter.

The roll structure includes a vertically disposed angle-shaped bracket formed of a pair of flanges disposed at right angles to each other and with one indicated at 11, anchored to the outer side face of upright 3 by the holdfast devices 12 and the other is indicated at 16. The flange 16 extends inwardly from the outer side of flange 11 and is positioned against the outer side edge of upright 3. Formed integral with the outer face, disposed transversely and at the center of flange 16 is a tubular member 10 having a reduced inner part projecting through slot 5. Extending in opposite directions from, disposed at right angles to the axis of and positioned in proximity to the reduced inner part of member 10 is a pair of stub shafts 15 endwise aligning, each carrying a vertically disposed roller 13 retained in position by suitable holdfast means, as shown, such as nuts engaging with the shaft. The rollers 13 are adapted to ride against the outer face of plate 4 adjacent slot 5.

Mounted in member 10 is a spring controlled slidable carrier or bolt-like bar 17 provided with a head 18 arranged exteriorly of the inner end of said member. Head 18 is formed with a pair of oppositely disposed endwise aligning stub shafts 19, each carrying a vertically disposed roller 14 retained in position on its shaft by holdfast means 20. The rollers 14 are adapted to ride against the inner face of plate 4 adjacent the slot 5, ride against the inclined rear faces of ribs 6, 7 and adapted to seat in the depressions 8, 9 to arrest movement of door 1 when it is completely closed or opened. When seated in depression 8, the door is locked in closed position and when seated in depression 9 the door is locked in open position. As the bar 17 is spring controlled, it will provide for rollers 14 frictionally engaging the inner face of plate 4 and such rollers coact with the rollers 13 for holding the door in partly opened or partly closed position when the rollers 13, 14 are positioned between the pairs of ribs 6, 7.

The member 10 at its outer end has its inner diameter enlarged to form an internal shoulder 10' intermediate its ends. The carrier 17 extends outwardly with respect to said shoulder and carries at its outer end an adjustable headed screw 25 for a controlling spring 23 for carrier 17. The latter has its outer portion surrounded by spring 23 which is interposed between the shoulder 10' and head of screw 25. Detachably engaging with the outer end of member 10 is a closure cap 28 therefor. The flange 16 and member 10 are formed respectively with permanently registering openings 47, 48 respectively. The opening 48 is adapted to register with a socket or opening 40 formed in the bar 17 for a purpose to be referred to.

Associated with the roll structure is a bolt mechanism for locking the carrier 17 from movement whereby door 1 will be retained in a completely opened or closed position.

The bolt mechanism is carried by flange 11, is arranged in an angled-shaped opening 49 formed in upright 3 and is adapted to have the bolt element thereof extend through openings 47, 48 and into socket 40 to lock carrier 17. The bolt mechanism includes an operating shaft formed with an outer portion 33, an enlarged intermediate portion 34 and an inner portion 35. Carried by the latter is an eccentric 36 surrounded by a strap 37 forming the outer part of the bolt element of said mechanism. The intermediate part of said element is indicated at 38 and is disposed at right angles to and extends inwardly from the outer side edge of strap 37. The inner part of such element is indicated at 39, extends outwardly at right angles to part 38 and is disposed in a plane parallel to the plane of strap 37. The intermediate part has its inner end merge into the rear end of part 39. A cotter pin 41 and disc 42 retains eccentric 36 on the inner portion 35 of the operating shaft. The latter is normally retained from movement by a spring 44 arranged in groove 50 formed in flange 11 and which bears against the bolt element. A key bushing is indicated at 43, is attached to flange 11, encloses the outer part 33 of the operating shaft and also assists to maintain the latter in the position shown in Figure 12. The operating shaft has a flange 51 which abuts flange 11 and is overlapped by the inner end of bushing 43. A key is indicated at 52'.

When door 1 is opened and closed respectively, its movement is from D to E or from E to D, Figure 2.

It will be assumed that the door is in the position shown in Figures 1, 2 and 9, the rollers 14 in depressions 8 and the bolt element removed from carrier or bar 17. The spring 23 acts to maintain rollers 14 in depressions 8. Grasping handle 29, door 1 is then pulled to the left, overcoming the action of spring 23 and removing rollers 14 from depressions 8. The rollers 14 after clearing ribs 8 bearing against the inner face of plate 4 and the rollers 13 at this time also bear against the outer face of plate 4. Through this arrangement, the door will be retained in its partly open position if it is not shifted to full open position. If the door is moved to complete open position, the rollers 14 will ride up ribs 7 and seat in depressions 9 whereby door 1 then will be held in full open position. Now if it be desired to lock door 1 in full closed or full open position after rollers 14 are seated in depressions 8, 9 respectively, the bolt mechanism is operated to provide for part 39 of the bolt element to enter socket or opening 40 in carrier or bar 17 thereby locking the latter.

The ribs 6 and 7 are termed combined shifting and retaining elements for the carrier 17.

With respect to Figure 7, the coupling plate indicated at 52 is not provided with the ribs 6, 7. That is to say, its inner face is plane throughout.

As to Figure 8, the coupling plate is indicated at 53 and has its inner face serrated or toothed as at 54. The rollers 55 which coact with the inner face of plate 53 are also serrated or toothed as at 56.

What I claim is:—

1. A lock for a sliding door comprising a lengthwise slotted coupling plate adapted to be secured to one face of the door and provided on its inner face in proximity to each end thereof with combined roller shifting and retaining means, and a roll structure including outer upper and lower rollers for engaging the outer face of the plate and a spring controlled carrier provided with inner upper and lower rollers for engaging the inner face of the plate and for selectively seating in one of said combined rollers shifting and retaining means for locking the door selectively in an open or in a closed position, said carrier slidably connecting the coupling plate to the roll structure.

2. A lock for a sliding door comprising a lengthwise slotted coupling plate adapted to be secured to one face of the door and provided on its inner face in proximity to each end thereof with combined roller shifting and retaining means, and a roll structure including outer upper and lower rollers for engaging the outer face of the plate and a spring controlled carrier provided with inner upper and lower rollers for engaging the inner face of the plate and for selectively seating in one of said combined roller shifting and retaining means for locking the door selectively in an open or in a closed position, said carrier slidably connecting the coupling plate to the roll structure, said carrier provided with means for adjusting the tension of the controlling spring thereof.

3. A lock for a sliding door comprising a lengthwise slotted coupling plate adapted to be secured to one face of the door and provided on its inner face in proximity to each end thereof with combined roller shifting and retaining means, a roll structure including outer upper and lower rollers for engaging the outer face of the plate and a spring controlled carrier provided with inner upper and lower rollers for engaging the inner face of the plate and for selectively seating in one of said combined roller shifting and retaining means for locking the door selectively in an open or in a closed position, said carrier slidably connecting the coupling plate to the roll structure, and a locking bolt mechanism releasably engaging in said carrier for locking it from movement to prevent the removal of the inner rollers of the carrier from that combined shifting and retaining means in which they are seated.

4. A lock for a sliding door comprising a lengthwise slotted coupling plate adapted to be secured to one face of the door and provided on its inner face in proximity to each end thereof with combined roller shifting and retaining means, a roll structure including outer upper and lower rollers for engaging the outer face of the plate and a spring controlled carrier provided with inner upper and lower rollers for engaging the inner face of the plate and for selectively seating in one of said combined roller shifting and retaining means for locking the door selectively in an open or in a closed position, said carrier slidably connecting the coupling plate to the roll structure, said carrier provided with means for adjusting the tension of the controlling spring thereof, and a locking bolt mechanism releasably engaging in said carrier for locking it from movement to prevent the removal of the inner rollers of the carrier from that combined shifting and retaining means in which they are seated.

5. A lock for a sliding door comprising a lengthwise slotted coupling plate adapted to be secured to one face of the door and provided on its inner face in proximity to each end thereof with combined roller shifting and retaining means, a roll structure including outer upper and lower rollers for engaging the outer face of the plate and a spring controlled carrier provided with inner upper and lower rollers for engaging the inner face of the plate and for selectively seating in one of said combined roller shifting and retaining means for locking the door selectively in an open or in a closed position, said carrier slidably connecting the coupling plate to the roll structure, and each of said combined roller shifting and retaining means consisting of a pair of spaced superposed ribs, each of said ribs being formed with a depression in its rear edge and having such edge inclining upwardly from its inner end to a depression, one pair of ribs being oppositely disposed with respect to the other pair of ribs.

6. A lock for a sliding door comprising a lengthwise slotted coupling plate adapted to be secured to one face of the door and provided on its inner face in proximity to each end thereof with combined roller shifting and retaining means, a roll structure including outer upper and lower rollers for engaging the outer face of the plate and a spring controlled carrier provided with inner upper and lower rollers for engaging the inner face of the plate and for selectively seating in one of said combined roller shifting and retaining means for locking the door selectively in an open or in a closed position, said carrier slidably connecting the coupling plate to the roll structure, a locking bolt mechanism releasably engaging in said carrier for locking it from movement to prevent the removal of the inner rollers of the carrier from that combined shifting and retaining means in which they are seated, and each of said combined roller shifting and retaining means consisting of a pair of spaced superposed ribs, each of said ribs being formed with a depression in its rear edge and having such edge inclining upwardly from its inner end to a depression, one pair of ribs being oppositely disposed with respect to the other pair of ribs.

7. A lock for a sliding door including a lengthwise slotted coupling plate adapted to be fixedly secured to one face of the door for bodily moving with the latter, and a roll structure having outer upper and lower rollers for frictionally engaging the outer face of said plate, said structure including a spring controlled carrier extending through and slidably connecting the plate to the roll structure, said carrier being provided with inner upper and lower rollers for frictionally engaging the inner face of said plate and coacting with said outer rollers for holding the door from sliding.

WILHELM BIRON.